Figure 1:
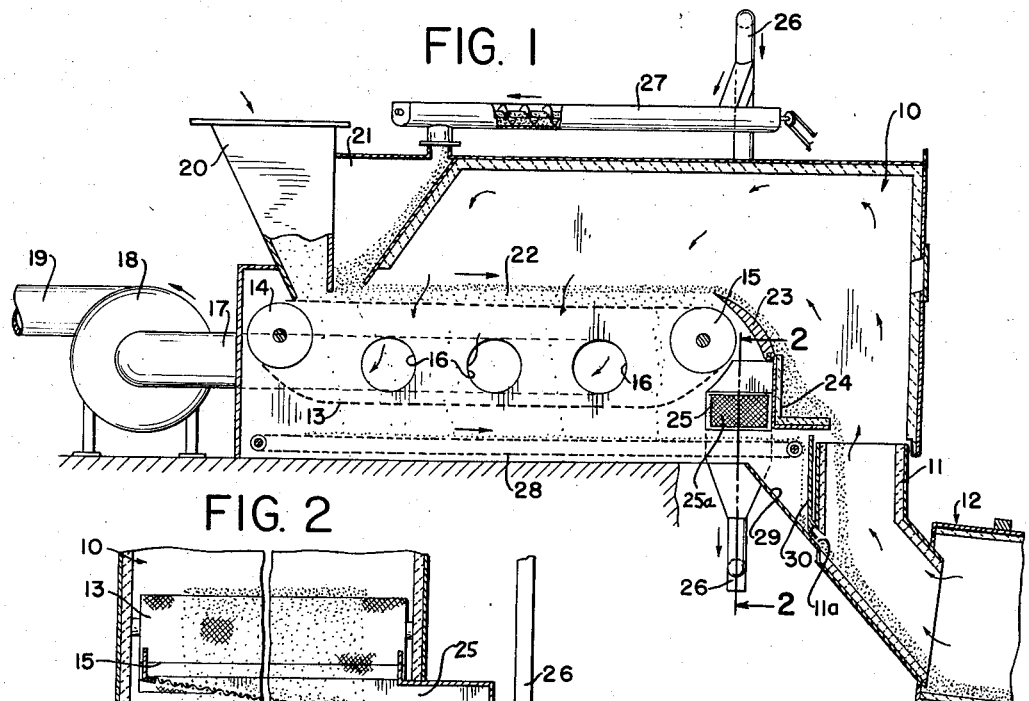

July 21, 1959    K. J. SYLVEST    2,895,231
APPARATUS FOR HEATING FINELY DIVIDED MATERIALS
Filed Nov. 27, 1956    3 Sheets-Sheet 1

INVENTOR
Karl Jens Sylvest
BY
Pennie Edmonds Morton Barrows Taylor
ATTORNEYS

July 21, 1959 K. J. SYLVEST 2,895,231
APPARATUS FOR HEATING FINELY DIVIDED MATERIALS
Filed Nov. 27, 1956 3 Sheets-Sheet 2

INVENTOR
Karl Jens Sylvest
BY
Penrie Edmonds Morton
Barrows Taylor
ATTORNEYS

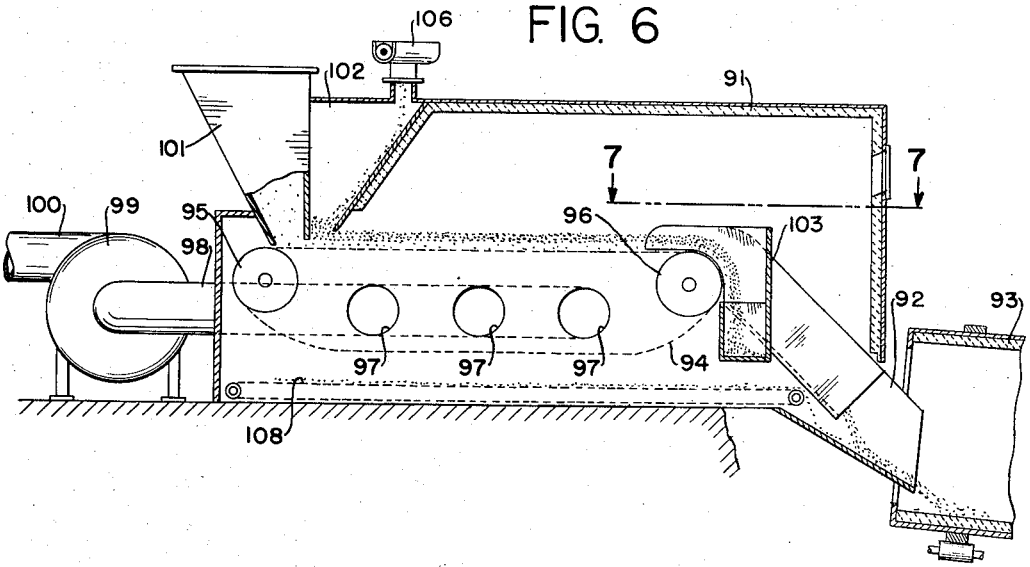
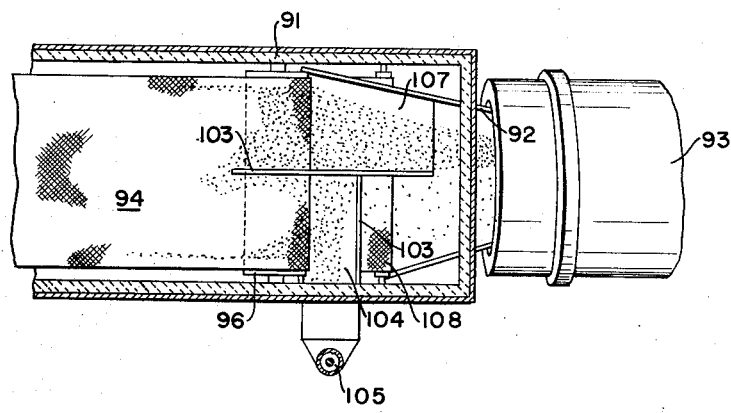

United States Patent Office 2,895,231
Patented July 21, 1959

2,895,231

APPARATUS FOR HEATING FINELY DIVIDED MATERIALS

Karl Jens Sylvest, Copenhagen-Valby, Denmark, assignor to F. L. Smidth & Co., New York, N.Y., a corporation of New Jersey Application November 27, 1956, Serial No. 624,679

Claims priority, application Denmark November 29, 1955

3 Claims. (Cl. 34—86)

This invention relates to the preheating of materials typified by cement raw materials, lime, ores, and similar products, which are to be subjected to a final heating operation. More particularly, the invention is concerned with a novel method for preheating materials, in the practice of which the materials are advanced in the form of a bed along a gas-permeable support, while hot gases are passed in a downward direction through the bed of material and the support. In accordance with the method of the invention, the material is heated gradually, so that, when the material is in the form of nodules, the water content of the nodules is driven off at such a rate that bursting of the nodules is avoided. In addition, the material protects the support against excessive temperatures, so that the life of the support is lengthened.

In the preheating of raw materials, such as cement raw materials to be burned in a rotary kiln, the simplest operation heretofore used involves depositing the materials continuously upon a traveling support at one end thereof to form a layer, passing the kiln gases downward once through the layer, and transferring the material discharged at the other end of the support to the kiln. In such an operation, the material on the support near the point of deposit is cold and often wet, so that so much heat is removed from the gases in their passage through the material that the temperature of the gases as they pass through the support is quite low. At the discharge end of the support, the material has the high temperature at which it is to enter the kiln, so that the gases after passage through the material at the end of the support referred to have a corresponding high temperature, which may be above 700° C. Even though the temperature of the gases may be somewhat below 700° C., exposure of the support to such a temperature materially shortens the life of the support. With the gas temperature below the discharge end of the support so high, the average temperature of the gases after their passage through the support may be as high as 250° C. and such a high temperature indicates that the thermal efficiency of the operation is poor.

The area of a support necessary for the passage of a given volume of kiln gases can be readily calculated when the velocity of the gases through the layer of material on the support is known. However, hot kiln gases may not be allowed to come into contact with many cold raw materials and, in the preheating of such materials, cold air is mixed with part of the hot gas stream, which is to pass through the layer of material at the feed end of the support. In practice, the amount of fresh air added is up to one-half the amount of gases coming from the kiln, so that the support must have an area 1.5 times as large as would be required but for the addition of the fresh air. As the supports used are ordinarily endless chain grates, which are expensive to construct, it is highly desirable to keep their size, and thus their initial cost, at a minimum and also to take all feasible measures to prolong their lives.

Another method of preheating materials involves passing the support with the bed of materials thereon through two successive zones and causing the hot gases to pass first through the material and support in the second zone near the discharge end of the support and then through the material and support in the first zone. While this method gives excellent thermal efficiency, the support is exposed to so high a temperature in the second zone that is life is materially reduced. Also, the practice of this method necessitates the use of a support of an area twice that required for the passage of the volume of gases issuing from kiln. This method thus has the disadvantages that the life of the support is short and, because of the greater size, the cost of the support is increased. Also, in the practice of the method described, two fans are ordinarily required to cause the gases to pass through the two zones, and dust collecting means must be provided to remove dust entrained in the gases in their passage through the material in the second zone, in order that such dust may not damage the second fan.

The present invention is directed to the provision of a method for preheating materials to be burned in a rotary kiln, which involves the passage of hot gases through a layer of the material traveling on a gas-permeable support, but does not require that the temperature of the gases be limited or that cold air be mixed therewith in order to protect the support. Also, the practice of the new method does not require an increase in the area of the support. The desired results are obtained in accordance with the invention by depositing the cold material on a support near one end to form a lower layer and distributing partially preheated material upon the layer to form one or more upper layers. Hot gases are passed downwardly through the bed to give up heat to the material and, at the discharge end of the support, the bed is divided into two portions with the first portion including at least a part of the upper layer or layers and the second portion including at least a part of the lower layer. The first portion of the divided bed is then delivered to the kiln, while the remainder of the bed is utilized wholly or in part for distribution upon the layer of deposited cold material to complete the bed. As a result of carrying out the preheating operation in the manner described, the temperature of the gases in contact with the discharge end of the support is much lower than in previous processes, since the support is protected by the layer of cold material which is an efficient heat-absorber. The temperature of the gases below the support near the discharge end may be only 200° C. or less and the average temperature of the gases below the support is about 150° C. This means that the thermal efficiency is excellent and the reason is that, in their passage through the bed of material, the hot gases first encounter material, which is partially preheated, so that the advantages of the counter-current principle are realized. Also, since the gases pass only once through the support, its area is theoretically only half that necessary in the practice of the method, in which the gases pass in series twice through the support, and only two-thirds the size of the support required when fresh air is added to the kiln gases in an amount equal to half the volume of the gases.

It is preferred to divide the bed horizontally at the discharge end of the support, with the upper part of the divided bed fed into the kiln and the lower part returned for further heating. However, the bed may be divided vertically into separate streams at the discharge end of the support, with one of the streams fed into the kiln and the remainder returned. When such vertical division is employed, the support is still protected by cold material and the area of the support required is about the same as when horizontal division is used, but the material fed into the kiln is not so uniformly heated as when horizontal division is used.

When the bed is divided horizontally, the level of the bed, at which the division is effected, determines whether all or only part of the material travels with the support more than once and, if more than once, how many times. Under constant operating conditions, the material entering the rotary kiln is equal in amount to the fresh material fed and, if the bed is at least twice as deep as the layer of material, all the material will be heated at least twice on the support. Operation under such conditions produces the best combination of effective preheating and protection of the support.

The bed of material through which the gases pass must be sufficiently permeable by the gases and, if the raw material to be heated is pulverulent, it must be agglomerated with water or other binding agent to form nodules before it can be heated. Such nodules of material cannot be brought into direct contact with hot gases leaving the kiln, since rapid heating of the nodules would cause them to burst and be converted into powder, which would prevent the gases from passing through the bed of material. This is the reason that, in the process in which the kiln gases pass through the material only once, cold air is mixed with the hot gases, as explained above. The preheating of nodules can be advantageously carried out in accordance with the invention because the passage of the gases through the upper layer on the support so reduces their temperature before they come into contact with the nodules that the liability of bursting the nodules is greatly reduced. At the same time, the necessity of employing additional cold air to prevent damage to the nodules is avoided.

In addition to the method, the invention comprehends apparatus, by which the method may be conveniently practiced. Such apparatus comprises a chamber divided by a gas-permeable support into upper and lower sub-chambers and the upper sub-chamber has an inlet for admission of hot gases, while the lower sub-chamber has an outlet for the gases. Means are provided for depositing cold material upon the support at one end to form a layer and, beyond such depositing means in the direction of travel of the support, there is disposed means for distributing partially preheated material upon the layer to form a bed. Near the discharge end of the support, the bed is divided into two portions by suitable means and one portion is passed on to the rotary kiln or other apparatus, where the final heating operation is to be performed, while the other portion is returned to the distributing means.

Figure 2:
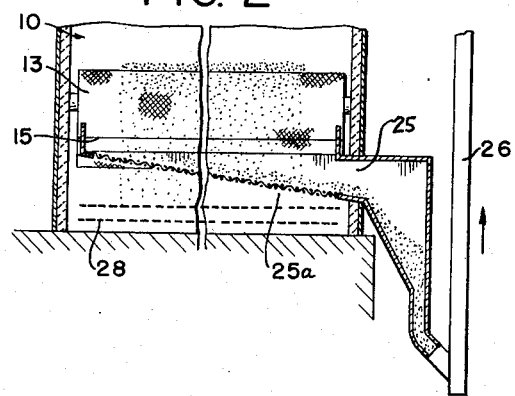

For a better understanding of the invention, reference may be made to the accompanying drawings, in which Fig. 1 is a view, partly in longitudinal vertical section and partly in elevation, of one form of apparatus for practicing the method of the invention;

Fig. 2 is a sectional view on the line 2—2 of Fig. 1;

Figs. 3, 4, 5, and 6 are views similar to Fig. 1 showing modified constructions; and Fig. 7 is a sectional view on the line 7—7 of Fig. 6.

The apparatus for the practice of the new method, which is shown in Figs. 1 and 2, comprises a chamber 10 having a discharge chute 11 at one end, which enters the upper end of a rotary kiln 12. A gas-permeable support in the form of an endless traveling grate 13 is trained about wheels 14, 15 within the chamber and the shaft of one set of wheels is driven to advance the grate with its top stretch moving toward chute 11. Hot gases, which enter the chamber from the kiln through chute 11, leave the chamber through a plurality of outlet openings 16 below the upper stretch of the grate, and the openings are connected by a pipe 17 to the intake of a fan 18 having a discharge pipe 19 leading to a stack.

A feed hopper 20 for fresh raw material is mounted at the end of the chamber remote from chute 11 to discharge material upon the upper stretch of the support 13 to form a layer. Just beyond the hopper 20 is a second hopper 21, which deposits a layer of partially preheated material upon the layer of raw material on the support to form a bed 22. As the gate advances beyond the hoppers, the hot gases from the kiln entering the chamber through chute 11 pass downward through the bed and support and leave the chamber through the exit openings 16. The gases heat the upper layer of material to the desired final temperature, while the layer of fresh material forming the lower part of the bed is partially preheated.

At the end of the traveling grate adjacent the kiln, the bed is divided between its upper and lower surfaces by a blade 23 mounted to extend across the travelling support with its front edge lying parallel to the surface of the grate. The blade scrapes an upper part from the bed and the material passing over the blade falls upon a shelf 24, which is mounted to extend across the chamber below the rear edge of the blade. The material landing on the shelf builds up until a pile is formed, after which material removed from the bed by the blade slides down the top of the pile and travels through chute 11 to enter the upper end of the kiln. The blade is preferably adjustable to vary the relative thickness of the two parts, into which the bed is divided, and, for this purpose, the blade may be pivotally mounted and provided with means for holding it in different angular positions.

The portion of the bed, which is not removed from the traveling support 13 by the blade 23, passes beneath the blade and enters a hopper 25 projecting through a side wall of the chamber. The partially heated material travels through hopper 25 and enters an elevator 26, by which the material is raised and discharged into the casing of a screw conveyor 27, which conveys the material to hopper 21. It is undesirable to feed back fine particles to the grate, so that the part of the bed to be returned should be screened. For this purpose, the hopper 25 may have a screen bottom 25a, through which the fines will fall, while the oversize material only will enter the elevator 26.

The material which falls through the grate 13 in chamber 10, lands upon a suitable conveyor 28, which discharges the material into a hopper bottom section 29 of chamber 10 lying below the shelf 24. The hopper section has a sloping wall 29 and a vertical wall 30 with the latter spaced from wall 29 to provide an opening, which may be closed by a weighted valve or like discharge device. The chute 11 has an opening 11a, through which material discharged from the hopper section may enter the chute and then pass into the kiln 12.

In the operation of the apparatus shown in Fig. 1, the fresh raw material fed by hopper 20 forms a layer in direct contact with the support 13 and this layer is immediately covered by a layer of partially preheated material discharged by hopper 21. The bed of material on the support is then heated by hot kiln gases traveling downward through the bed and support and passing out of chamber 10 through the outlet openings 16. At the end of the traveling support, the upper portion of the bed is removed by the blade 23 and delivered through chute 11 into the kiln, while the lower part of the bed enters the hopper 25 and is returned to hopper 21 for discharge upon the traveling support. Material of sufficient fineness to pass through the grate is conveyed to the hopper bottom section 29 and passes into the kiln with the material from the upper part of the bed.

By adjusting the blade 23, so that a thin layer of material is removed from the bed and fed into the kiln, it is possible to effect a substantial preheating of the material. If the part of the bed removed by the blade is thinner than the part returned, a controlled repeated circulation of material and resultant uniform heating thereof may be obtained. Cement raw materials may thus be subjected to uniform calcination to the precise degree desired. The amount of material entering the kiln always equals the amount fed to the grate from hopper 20 so long as the discharge openings of the hoppers 20 and 21 remain constant in area. The number of times that the material is traversed by the hot gases, accordingly, depends on the adjustment of the blade 23, which in turn controls the total thickness of the bed. The bed thickness employed depends on the size of the pieces or nodules of material being heated and, when the material is in the form of nodules of an average size of 0.4", the thickness of the bed may be about 8", while the thickness of a bed made up of pieces, for example, of limestone varying from about 1⅛" to about 1⅝" may be 20" to 30".

If desired, a number of blades similar to blade 23 may be provided, so that the bed is divided into a plurality of layers. In that event, the material in the several layers below the topmost one is delivered into respective hoppers similar to hopper 21. The least highly heated part of the bed returned is first distributed upon the layer of cold raw material and the other parts returned are then distributed one upon another in the order of their temperatures. If desired, a layer of inert material may be deposited upon the support and the cold raw material distributed over the inert layer, the inert layer being used repeatedly.

Figure 3:
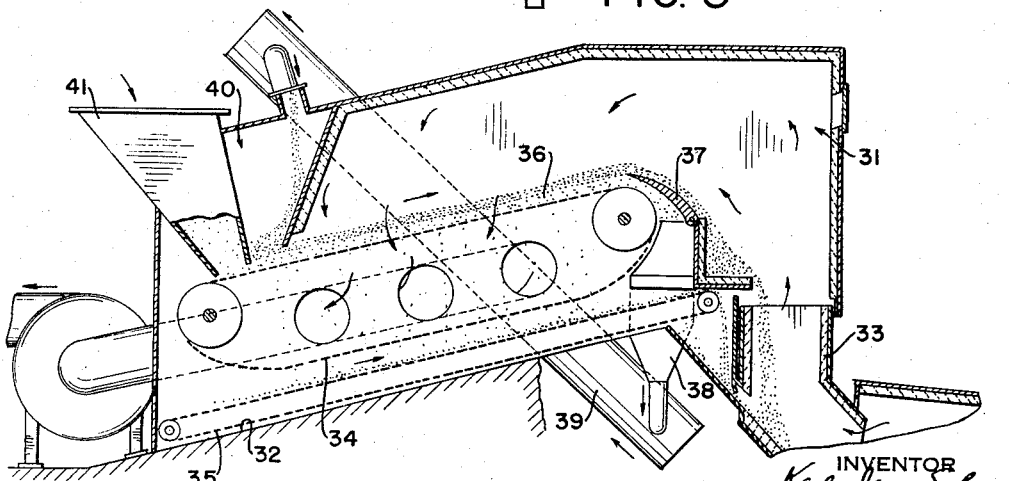

The apparatus shown in Fig. 3 is similar to that shown in Figs. 1 and 2, except that the chamber 31 has a bottom 32 upwardly inclined toward the end of the chamber from which the chute 33 leads, and the traveling support 34 and the conveyor 35 beneath the support are similarly inclined upwardly. With this construction, the bottom portion of the bed of material 36 removed from the support 34 by the blade 37 enters a hopper 38, which conducts the material into the casing of a bucket elevator 39 extending upwardly at an incline. The elevator discharges into a chute 40 lying just beyond the feed chute 41 for the raw material. The apparatus of Fig. 3 functions in the same manner as that shown in Fig. 1, but is simpler in construction, in that the elevator 39 replaces the elevator 26 and screw conveyor 27.

Figure 4:
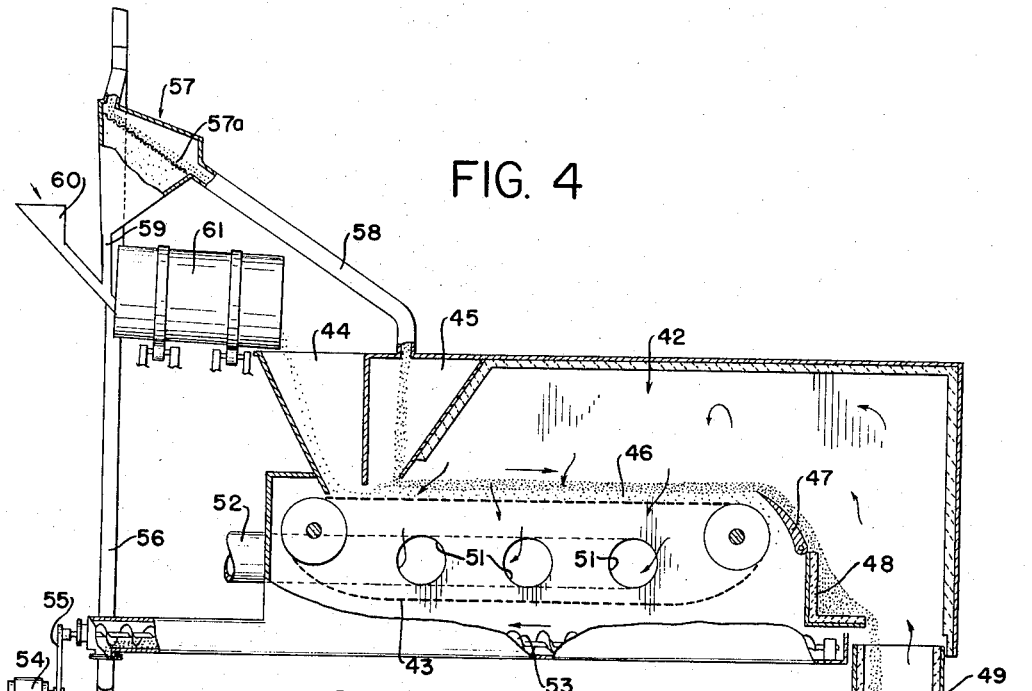

In the apparatus shown in Fig. 4, the chamber 42 contains a traveling support 43, which receives nodules of raw material from a feed hopper 44 and partially preheated material from a hopper 45. The bed 46 of material on the support is divided by a blade 47, so that the upper part of the bed falls upon a shelf 48 and then passes through a chute 49 and into the upper end of the rotary kiln 50. In its travel on the support, the material on the bed is heated by hot kiln gases, which pass downwardly through the bed and support to leave the chamber through discharge openings 51, to which the exhaust pipe 52 is connected through branches. The material forming the lower part of the divided bed and the fine material, which passes through the support, fall to the bottom of chamber 42, which is made with sloping sides converging downwardly to a trough containing a conveyor screw 53. The screw shaft is driven by a motor 54 through a belt 55 and the material advanced by the screw enters an elevator 56, which discharges into a chamber 57. The chamber contains a screen 57a, upon which the material from the elevator is deposited, and the oversize material passes from the screen through a pipe 58 to enter the hopper 45. The fines from the screening operation pass from chamber 57 through a pipe 59 and are mixed with fresh raw material from the hopper 60 and enter the nodulizing drum 61. The drum is rotated about a horizontal axis and is supplied with liquid for nodulization in the usual way. The fresh raw material may be a watery slurry, and, in that event, the screen 57a is constructed to permit the necessary amount of dry returned material to enter the drum for mixture with the slurry to produce nodules of a suitable moisture content, such as, for example, not to exceed 20%. In order to reduce the amount of returned material required for mixture with the slurry, the water content of the slurry may be reduced, as, by passage over a vacuum filter, before the slurry enters the drum. The nodules formed in the drum 61 are discharged therefrom into the raw material hopper 44.

Figure 5:
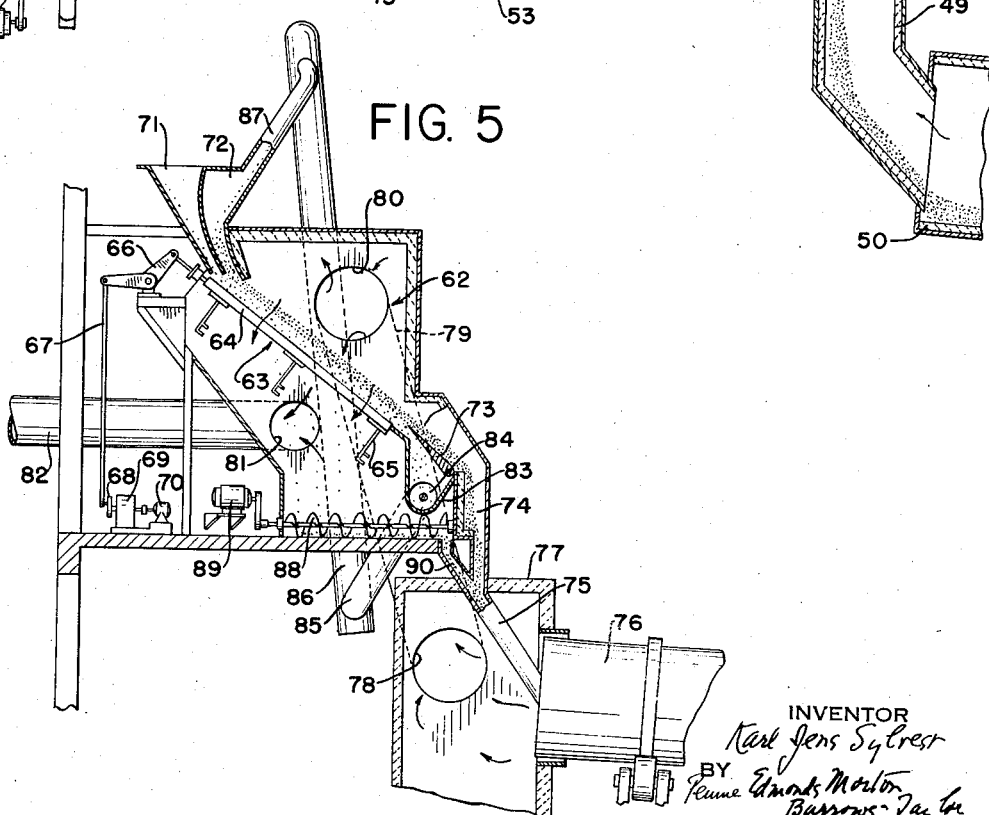

In the apparatus shown in Fig. 5, the chamber 62 contains a support 63, which is made of a plurality of closely spaced longitudinal grate bars 64 mounted on structural members 65 at an inclination slightly less than the angle of slide of the material. Alternate bars of the grade are connected for reciprocation by a bell crank lever 66 operated by a rod 67 connected to an eccentric pin on a disc 68. The disc is attached to the output shaft of a speed reducing device 69 having its input shaft driven by a motor 70.

A hopper 71 is provided for discharging raw material upon the upper end of support 63 and just below hopper 71 is a second hopper 72, by which partially heated material is discharged upon the first layer to form a bed of material on the support. At the lower end of the support, the bed is divided into two parts by a transverse blade 73 and the material forming the upper part of the bed passes over the blade and enters a chute 74 leading to a pipe 75. The upper end of the kiln 76 enters a hood 77 and the pipe 75 extends through the hood and into the end of the kiln. The hood has an outlet opening 78 for kiln gases, which is connected by a pipe 79 to an inlet opening 80 in the wall of the chamber above the support 63. The chamber has an outlet opening 81, from which a pipe 82 leads to a fan (not shown). The material discharged from the support 63 beneath the blade 73 enters a trough 83 containing a screw conveyor 84, which discharges the material into a pipe 85 leading to an elevator 86. The material discharged from the elevator passes through a pipe 87 into the hopper 72. Fine material, which passes through the grate, is advanced by a screw conveyor 88 driven by a motor 89 to a pipe 90, which leads from the bottom of the chamber and is connected to the pipe 75.

The operation of the apparatus shown in Fig. 5 is generally the same as that of the apparatus shown in Fig. 1, in that a bed of material is formed on the support 63 with the bed made up of a lower layer of fresh raw material and an upper layer of partially heated material. As the bed is caused to move down the support by the reciprocation of the movable grate bars, the hot gases from the kiln pass through the bed and support to heat the material. At the lower end of the support, the upper layer is removed from the bed by the blade 73 and delivered into the kiln together with the fine material, which falls through the support and is advanced by conveyor 88, while the lower layer of the bed is returned to the hopper 72 to be used in the formation of the upper layer of a bed.

The apparatus shown in Fig. 6 is similar to that illustrated in Fig. 1 and includes a chamber 91 having a discharge chute 92 at one end, which enters the upper end of a rotary kiln 93. An endless traveling grate 94 forming a gas-permeable support is trained about wheels 95, 96 within the chamber and the shaft of one set of wheels is driven to advance the grate. Hot gases entering the chamber from the kiln through chute 92 pass through the grate and the material thereon and leave the chamber through a plurality of outlet openings 97 below the upper stretch of the grate and the openings are connected by a pipe 98 to the intake of a fan 99 having a discharge pipe 100 leading to a stack.

A feed hopper 101 for fresh material is mounted at the end of the chamber remote from the chute 92 and discharges material upon the upper stretch of the grate to form the bottom layer of a bed. A second hopper 102 distributes a layer of partially preheated material upon the layer of raw material. At the end of the grate adjacent the kiln, the bed of material on the grate is divided vertically and, in the construction illustrated, the division of the bed is effected by a vertical blade 103 mounted on the wall of a hopper 104 and dividing the bed into two streams, one of which enters the hopper and is then raised by an elevator 105 and conveyed by a screw conveyor 106 to hopper 102. The second stream falls into a chute 107, which conducts it into chute 92 leading into the kiln. Fine material, which falls through the grate, is advanced by a suitable conveyor 108 and delivered into chute 92 to enter the kiln with the second stream. Suitable conventional valve means may be provided for passing the material into the kiln without permitting the gases to enter the lower part of chamber 91.

I claim:

1. An apparatus for preheating raw material to be burned in a rotary kiln, which comprises a chamber, means for supporting and advancing a bed of material, including a gas-permeable support dividing the chamber into upper and lower sub-chambers, means receiving the cold raw material and converting it into nodules, means for depositing the cold raw material nodules upon the support adjacent one end to form a layer, means adjacent the depositing means for distributing partially preheated material upon the layer to form a bed, an inlet into the upper sub-chamber for introduction of hot gases, an outlet from the lower sub-chamber for the gases, means adjacent the other end of the support for dividing the bed into at least two portions with the first portion including at least a part of the upper layer and the second portion including at least a part of the lower layer, means for conducting the first portion of the divided bed out of the chamber, and means for transferring the second portion of the divided bed to the distributing means.

2. The apparatus of claim 1, which includes screening means receiving the transferred portion of the divided bed and delivering the oversize fraction to the distributing means and the fine fraction to the nodulizing means.

3. An apparatus for preheating raw material to be burned in a rotary kiln, which comprises a chamber, means for supporting and advancing a bed of material, including a gas-permeable support dividing the chamber into upper and lower sub-chambers, means for depositing cold raw material upon the support adjacent one end to form a layer, means adjacent the depositing means for distributing partially preheated material upon the layer to form a bed, an inlet into the upper sub-chamber for introduction of hot gases, an outlet from the lower sub-chamber for the gases, means adjacent the other end of the support for dividing the bed into at least two portions with the first portion including at least a part of the upper layer and the second portion including at least a part of the lower layer, means for conducting the first portion of the divided bed out of the chamber, means for screening the second portion of the divided bed to separate the portion into fine and oversize fractions, means for combining the fine fraction from the screening means with the first portion of the divided bed being conducted out of the chamber, and means for delivering the oversize fraction to the distributing means.

References Cited in the file of this patent

UNITED STATES PATENTS

| | | |
|---|---|---|
| 2,090,363 | Wendeborn | Aug. 17, 1937 |
| 2,375,487 | Newhouse | May 8, 1945 |
| 2,819,539 | Rausch et al. | Jan. 14, 1958 |

FOREIGN PATENTS

| | | |
|---|---|---|
| 231,209 | Switzerland | May 16, 1944 |